United States Patent [19]

Toughlian et al.

[11] Patent Number: 5,428,218
[45] Date of Patent: Jun. 27, 1995

[54] VARIABLE TIME-DELAY SYSTEM FOR BROADBAND PHASED ARRAY AND OTHER TRANSVERSAL FILTERING APPLICATIONS

[75] Inventors: Edward N. Toughlian, Rome, N.Y.; Henry Zmuda, Carteret, N.J.

[73] Assignee: The United States of America as represented by the Secretary of the Air Force, Washington, D.C.

[21] Appl. No.: 134,310

[22] Filed: Sep. 30, 1993

[51] Int. Cl.⁶ .................. H01J 5/16; H01J 40/14; H01Q 3/22
[52] U.S. Cl. .................. 250/227.12; 342/375
[58] Field of Search .................. 250/227.12, 201.9; 359/287, 314; 342/375

[56] References Cited

U.S. PATENT DOCUMENTS

| | | | |
|---|---|---|---|
| 4,091,274 | 5/1978 | Angelbeck | 250/201.9 |
| 4,390,247 | 6/1983 | Freyre | 350/358 |
| 4,565,983 | 1/1986 | Gratze | 333/193 |
| 4,696,061 | 9/1987 | Labrum | 455/609 |
| 4,976,518 | 12/1990 | Burns | 350/96.16 |
| 4,996,412 | 2/1991 | Anafi et al. | 250/201.9 |
| 5,117,239 | 5/1992 | Riza | 342/375 |
| 5,220,163 | 6/1993 | Toughlian et al. | 250/201.9 |

FOREIGN PATENT DOCUMENTS

| | | | |
|---|---|---|---|
| 52-76827 | 6/1977 | Japan | 250/227.12 |
| 52-76828 | 6/1977 | Japan | 250/227.12 |

Primary Examiner—William L. Sikes
Assistant Examiner—Tiep H. Nguyen
Attorney, Agent, or Firm—Robert L. Nathans; Stanton E. Collier

[57] ABSTRACT

A variable time delay system for broadband phased array receive and other transversal filtering applications is disclosed and employs a segmented mirror device (SMD) and a linear fiber array to realize a quantized variable delay line. The use of the SMD allows for extremely high packing density without the large losses usually associated with switched fiber schemes.

16 Claims, 3 Drawing Sheets

VARIABLE TIME-DELAY SYSTEM FOR BROADBAND PHASED ARRAY AND OTHER TRANSVERSAL FILTERING APPLICATIONS

STATEMENT OF GOVERNMENT INTEREST

The invention described herein may be manufactured and used by or for the Government for governmental purposes without the payment of any royalty thereon.

BACKGROUND OF THE INVENTION

A good deal of recent literature dealing with optical signal processing techniques concerns the formation of an electromagnetic radiation pattern for phased array antennas. Except for the approaches which utilize switched fiber architectures, most beamforming systems, however novel, are limited to narrowband operation. Aside from the switched fiber systems, other approaches typically use an optical heterodyne process to produce an RF phase shift which restricts its use to narrowband operation for phased array applications. To achieve wideband performance requires variable time delay to steer the transmitted/received RF beam. Though something as simple as a length of optical fiber can act as a delay line, the ability to attain variable delay has required the use of complicated and lossy switching architectures.

A system which results in many variable delay lines can be implemented using a single optically tapped acousto-optic (A/O) modulator; Toughlian et al., "A photonic variable rf delay line for phased array antennas" IEEE J. Lightwave Technology 8(12), 1824–1828 (1990). This approach only functions efficiently in the transmit mode of operation, where one modulating signal is to be delayed and distributed to individual detectors, one for each antenna element. In the receive mode of operation, the incoming signal from each antenna element must first be delayed and then summed to a single detector. Thus, in the receive mode of operation, the non-reciprocal character of acousto-optic modulators requires the use multi-channel A/O cells i.e. one A/O cell per antenna element. This makes their use infeasible in any application where power and weight are the primary concerns.

A phased array receive system is similar to that of a transversal filter system. A basic transversal filter (parallel) configuration consists of an RF input which is split and sent to different delay lines possibly with amplitude weighting. These weighted delayed versions of the input signal are summed to yield the desired response. The general concept is illustrated in FIG. 1a showing an array of variable delay lines 1, input terminal 5 and summer 3 coupled to the outputs of the delay lines. FIG. 1b shows the analogy to the phased array antenna case. There we see a point source radiator 5' in the far field which propagates to the antenna array where each antenna element receives a delayed version of the source. The goal is to choose values of delay so as to make the antenna array "listen" in a preferred direction. By varying the delays the antenna array can be made to listen in different directions. Consequently the phased array receive system is one specific application of transversal filter signal processing.

It is desirable to provide a new optical processor for the control of a broadband phased array receive system or any other application where an adaptive transversal filter is required.

BRIEF SUMMARY OF THE INVENTION

The processor of the present invention can utilize a type of spatial light modulator (SLM) known as a segmented mirror device (SMD), The SMD is in essence an NxN array of independently controllable mirror elements capable of tilt and translation. The SMD is used as a means for steering light into a delay line array. The tilt angle of a particular mirror segment of the mirror array controls which delay line of the delay line array will receive at its input the light beam reflected from the particular mirror segment, and so forth for all of the remaining mirror segments of the SMD. The outputs of the delay line array are summed and applied to a photodetector which converts the light back to electrical signals. This approach has several distinct advantages. The number of elements in a SMD can be quite large (silicon integrated circuit type SMDs can have in excess of $10^6$ independently controllable mirrors) and the same number of filter/antenna elements (one for each SMD element) may be used. When electro-optic devices are used for a switched fiber architecture, the optical switching matrices are a major source of loss. Here an essentially lossless segmented mirror device (SMD) serves as the controller replacing the switching element. Thus a practical variable delay line implementation is provided for wideband i.e. pulsed and chirped radar, spread spectrum, dual frequency, etc. signal processing.

BRIEF DESCRIPTION OF THE DRAWINGS

Various features of the invention will become more apparent upon study of the following description taken in conjunction with the drawings in which.

DETAILED DESCRIPTION OF PREFERRED EMBODIMENTS OF THE INVENTION

Figure 1A:
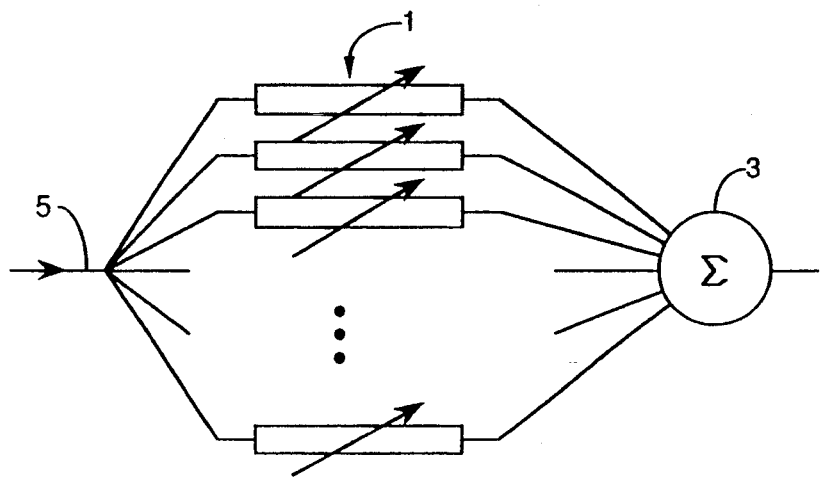
FIG. 1a illustrates a prior art transversal filter and FIG. 1b illustrates a prior art phased array receiver.
Figure 1B:
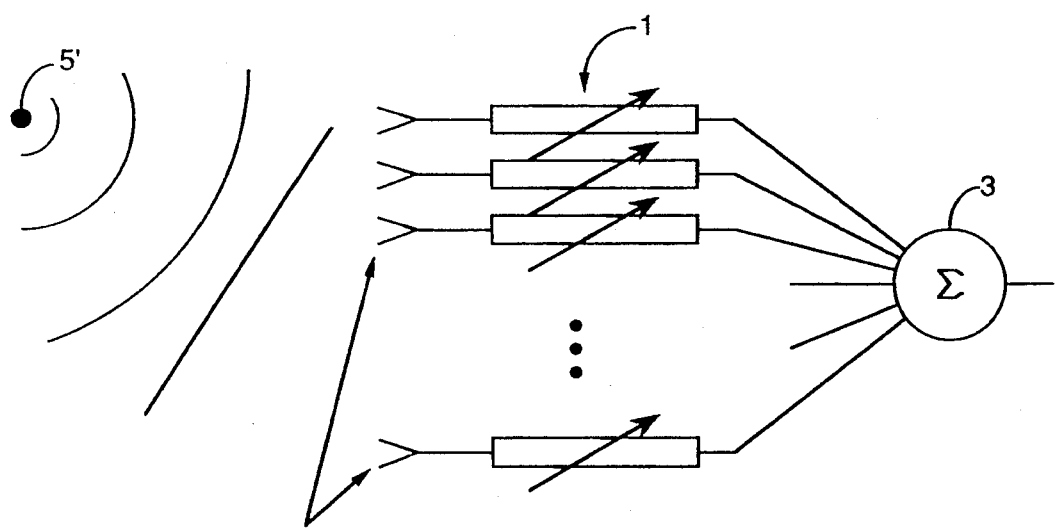
Figure 2:
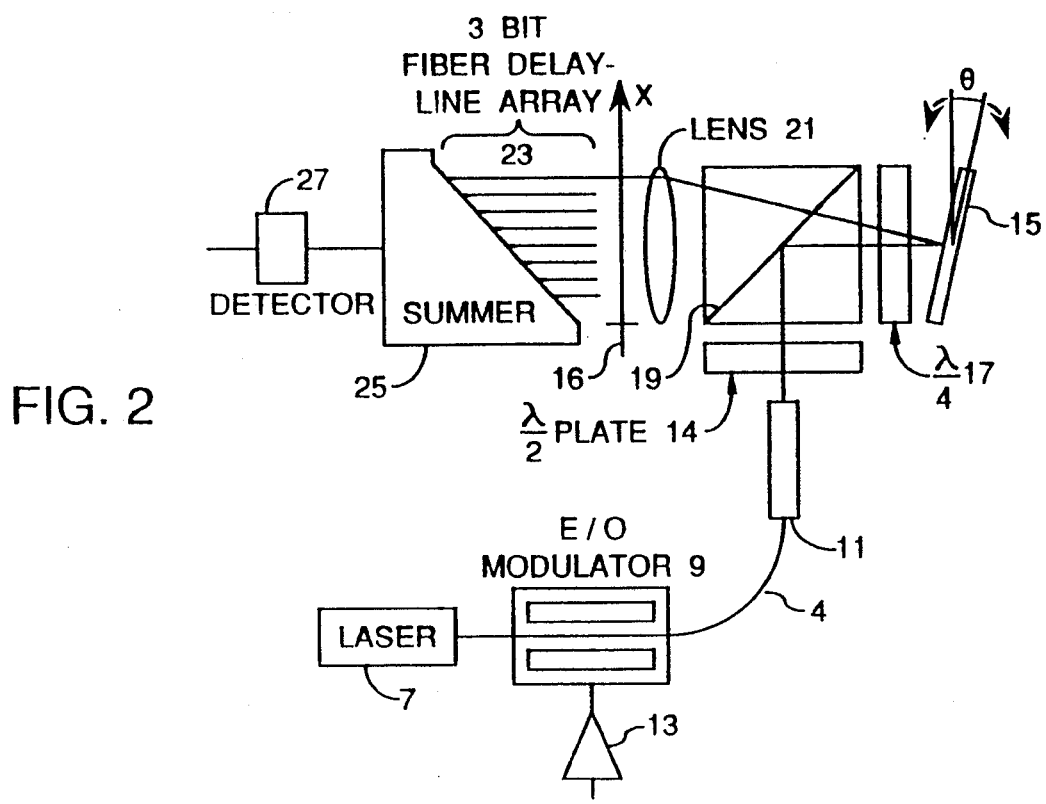
FIG. 2 illustrates a single quantized variable delay line element.

The essential features of a single variable delay element are shown in FIG. 2. In the figure it is seen that the RF signal is amplified by amplifier 13 and used to modulate light with any of a variety of modulation methods. The electro-optic modulator 9 modulates light produced by laser 7 in accordance with this RF signal. Thus the laser light source and the modulator comprise a light pulse generator means. The light is fiber coupled via 4 and sent to a collimating lens such as a graded index or GRIN rod collimator 11. The light is polarized at the source such that it is reflected by a polarizing cube 19 and directed to the right onto a tiltable mirror segment 15. The modulated signal then reflects off of the mirror where it makes a second pass through a quarter-wave plate 17. This configuration of mirror and quarter-wave plate results in rotation of the polarization of the light by 90° degrees and thus light is now transmitted through the cube 19 and sent to focusing lens 21.

The tilt of the mirror in essence directs the light at a particular angle (spatial frequency). The Fourier transforming property of the lens produces a spatial impulse, (focused beam) whose spatial position varies linearly along the x-axis 16 as a function of the tilt of the mirror.

An array of optical channels 23, which preferably comprise an array of optical fibers, is provided. Each fiber thereof having a different length and hence time delay, is placed along the x-axis as shown. The outputs of the fiber delay lines are summed by summer 25 and detected by a single photodetector 27 which converts the light signals exiting the delay lines into electrical signals. In this way a (quantized) variable delay is obtained. The purpose of the half wave plate 14 is to ensure maximum reflection of the light source by the beamsplitting cube, by rotating the polarization of the linearly polarized light to the proper angle.

Despite its inherent simplicity, the system presented here has several advantages over other types of switched fiber delay line configurations. These other methods employ electro-optic switches as a means to select a particular delay. These switches tend to be quite lossy and inefficient requiring high power budgets. This has made extremely large order systems impractical where such switching matrices are used. The SMD approach which can be utilized in the practise of the present invention is a natural for extremely large arrays.

Figure 3:
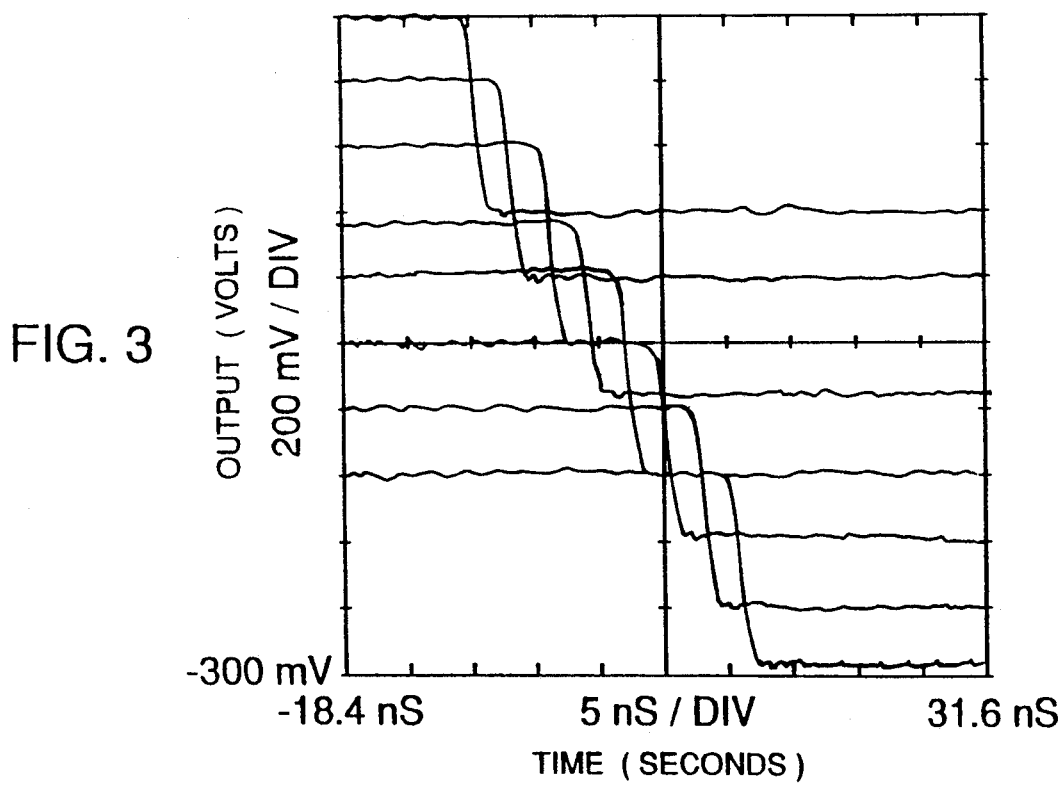
FIG. 3 shows an oscilliscope output of step response for a three bit delay line array.

The proof-of-concept system illustrated in FIG. 2 was constructed on an optical bench. A linear array of eight multimode fibers were fixtured in a v-groove assembly. This provides a variable delay line system with 3 bit resolution. The fibers were cut to differential lengths of 2 feet to obtain about 3 nanoseconds of differential delay between adjacent fibers. A pulse generator was used to modulate a diode laser. FIG. 3 shows the step response of the system for each of the eight delay lines, each trace has been vertically displaced one division for clarity, on a digitizing oscilloscope. Using a 10 millimeter lens, approximately 6 milliradians of mirror tilt was required to access each delay line.

For a typical phased array application, the ability to steer an aperture ±60° degrees in half degree increments requires 240 steps of delay which is approximately 8 bits of resolution. Since the phased array application is one example of transversal filtering, this same resolution suffices for most filtering applications. For a typical electrostatically or electrostrictively driven tiltable mirror (SMD element or segment) displacements of 4 microns or greater are readily available. Calculations show that for the simple lensing system in FIG. 2 and for typical fiber diameters, only a few bits of delay resolution can be obtained. This limitation is overcome with a more sophisticated lensing system shown in FIG. 4.

THE MULTI-ELEMENT PROCESSOR

Figure 4:
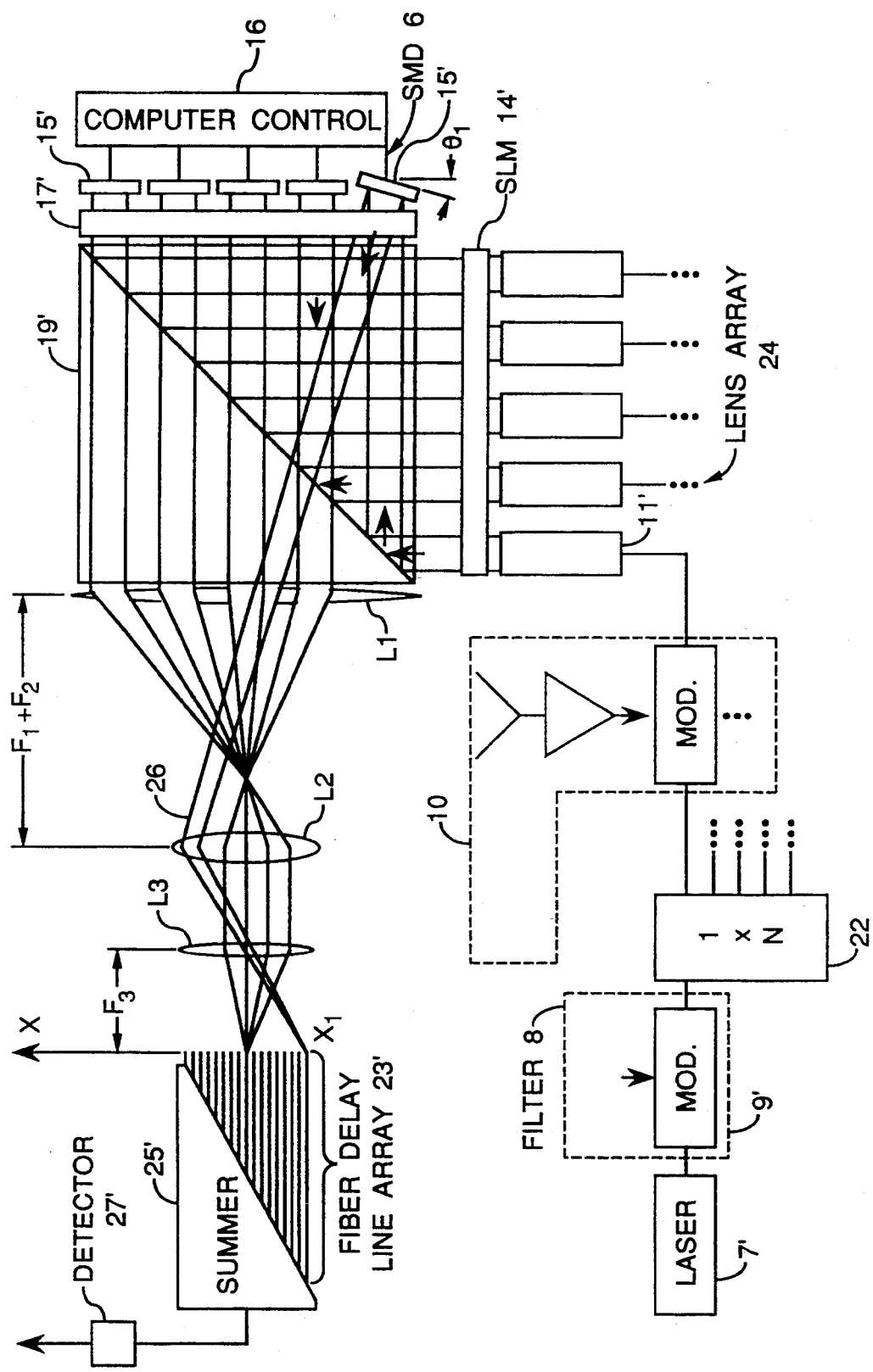
FIG. 4 illustrates a wideband phased array receiving system.

A compact system with high packing density is illustrated in FIG. 4. The primed numbers have like components described in connection with FIG. 2. The lensing system shown is used to obtain the required eight bit or more resolution and to make the system physically small. This embodiment of the invention uses a beam replication means comprising a one-by-N optical splitter 22 each output being coupled to an associated GRIN lens of GRIN lens array 24 as indicated. Unit 8 or unit 10 would be connected as indicated for a transversal filter or phased array receiver respectively. The output of each GRIN lens 11' is sent to a single mirror element or segment 15' of an array of independently tiltable mirrors of SMD 6, one mirror element for each delay (antenna) element. One such commercially available twenty element piezoelectric SMD being used specifically for phased array and transversal filtering applications is discussed in Zmuda and Toughlian, "Adaptive microwave signal processing: a photonic solution." Microwave Journal 35(2) 58–71 (1992). SMD 6, controlled by controller 16, may be described as a steering means for selectively steering or altering the direction of individual light beams directed at the input portion of the delay line array 23'. Steering means other than an SMD may be employed such as SLMs not having moving parts. Such a device is mentioned below. Amplitude SLM 14' is provided for the purpose providing greater signal processing capability by having the ability to obtain amplitude weighing in addition to variable time delay.

The function of the lensing system shown in FIG. 4, comprising lenses L1, L2 and L3, is to magnify the mirror tilt angle as well as to focus the reflected light from each mirror element onto the linear fiber array 23'. The lensing system may also be described as a projection means for projecting light reflected off of the SMD upon the input portion of the delay line array. Note that all time delay elements share the same set of delay lines. The lowest mirror segment 15' is shown tilted to a degree to cause reflected beam 26 to illuminate the lowest fiber of array 23'. It can be shown for the lensing arrangement shown in FIG. 94 that the position $x_i$ along the fiber array as a function of the mirror angle $\theta_i$ is given by $$x_i = \frac{F_1 F_3}{F_2} \tan(2\theta_i) \approx 2 \frac{F_1 F_3}{F_2} \theta_i \quad (1)$$

where $F_1$, $F_2$, and $F_3$ are the focal lengths of lenses L1, L2 and L3 respectively. Since all time delay elements utilize the same set of delay lines, the summation and detection is as discussed previously. Of course more exotic lensing systems may be employed. These can further enhance the system performance with regard to electrical characteristics or other related parameters. It is also possible to use more than one linear fiber array so as to obtain a multiple output system. For the antenna application, this would allow the dynamic restructuring of the array into independent sub-arrays.

Again examining some typical numbers (see the last mentioned paper) we see that if 256, 50-micron diameter fibers constitute the linear array, resulting in approximately a 1.25 millimeter width then for the SMD displacement previously given, using $F_1=6.25$ centimeters, $F_3=5$ centimeters, and $F_2=0.5$ centimeters would result in the 8 bit delay resolution required. In effect, the ratio $F_1/F_2$ provides the necessary demagnification and assures that the light focused into the fiber by $F_3$ is within its numerical aperture.

The single most important characteristic of the system discussed is its wide electrical bandwidth. In the phased array applications this eliminates the dispersive beampointing error associated with narrowband systems known as squint. The SMD based system eliminates the large loss usually associated with switched fiber systems and allows for a practical implementation of a phased array antenna receive system with a large number of elements. This receive system utilizes many of the same optical components employed in a wideband transmit system published previously. See Toughlian and Zmuda, "Variable time delay for RF/microwave signal processing," Optical Technology for Microwave Applications V, Proc.SPIE 1476, 107–121

(1991). This now allows for an integrated transmit receive system required in many applications.

One method of performing transversal filtering functions is to use digital signal processing techniques. The bandwidth of these systems is severely limited and is generally not real time. To extend the system bandwidth into the microwave regime and beyond and to achieve real time processing ability, tapped stripline or equivalently tapped fiber delay line architectures have been employed. These systems generally have fixed delays with variable amplitude weights and hence are of limited versatility as a reconfigurable filter. These systems also tend to be quite lossy since they typically utilize switches with large power budgets or inefficient energy tapping methods. The system described herein, with its large electrical bandwidth and variable time delay makes it useful, for example, as a wavelet signal processor, currently under investigation by many investigators. As previously mentioned, current SMD technology promises devices with over $10^6$ mirror elements, with one mirror element per filter (antenna) element. For example, the need for implementing a lightweight, low power controller for such a large phased array system is essential for future space-based surveillance needs.

For the transversal filtering application, an attractive alternative to using a grin-rod array for launching light onto the SMD is a diffractive optic device. See O. Rioul et al, "Wavelets and Signal Processing," IEEE "Signal Processing Magazine" pp. 14–38, October 1991. These devices are capable of replicating a single modulated input beam to tens of thousands of independent uncoupled non-overlapping output beams. In this way, as with the grin-rod array or pigtailed microlens array, diffraction effects and hence crosstalk from the SMD can be minimized.

Finally it is to be noted that other SLMs exist for steering optical beams beside using a SMD. One promising SLM employs the electro-optic effect to obtain a variable spatial phase gradation which in effect forms a tiltable transmissive mirror. See D. Sumberg, "An electro-optic based variable photonic delay line phased array antenna applications," Final Technical Report, RL-TR-91-204, Rome Laboratory (September 1991).

Overall it is seen that a diversity of components exist for performing the various optical processing functions. Such flexibility makes the ultimate success of a fielded system more likely.

While preferred embodiments of the invention have been described, other embodiments will occur to workers in the art, and thus the scope of the invention is to be defined by the terms of the following claims and art recognized equivalents thereof.

What is claimed is:

1. A variable time delay adaptive transversal filter comprising:
   (a) a segmented mirror device (SMD) including an array of individually tiltable mirror segments;
   (b) a light pulse generator means;
   (c) replicator means for replicating a light pulse produced by said light pulse generator means and first projection means for applying each replicated light pulse to an associated mirror segment of said SMD;
   (d) a light transmissive delay line array having an input portion and comprising an array of optical fibers said optical fibers having different lengths;
   (e) output means for producing an output pulse for each light pulse exiting said delay line array;
   (f) second projection means for projecting light reflected off of said tiltable mirror segments upon the input portion of said delay line array;
   (g) control means for individually varying tilts of said tiltable mirror segments for in turn causing light reflected from each mirror segment to be inserted into a particular one of said optical fibers of said light transmissive delay line array depending upon a degree of tilt of each mirror segment.

2. The filter of claim 1 wherein said output means includes summer means for summing light pulses exiting said light transmissive delay line array and further includes photodetector means for converting the light pulses exiting said delay line array to electrical signals.

3. The filter of claim 2 wherein said light pulse generator means comprises a laser for producing coherent light and an electro-optic modulator for modulating coherent light exiting said laser.

4. The filter of claim 2 wherein said second projection means includes focusing means for focusing light reflected off of said mirror segments upon input portions of individual optical fibers.

5. The filter of claim 1 wherein said light pulse generator means comprises a laser for producing coherent light and an electro-optic modulator for modulating coherent light exiting said laser.

6. The filter of claim 1 wherein said second projection means includes focusing means for focusing light reflected off of said mirror segments upon input portions of individual optical fibers.

7. A variable time delay adaptive transversal filter comprising:
   (a) light beam generator means for producing a group of light beams;
   (b) a light transmissive delay line array having an input portion and including an array of optical fibers having different lengths;
   (c) light beam steering means for individually steering light beams produced by said light beam generator means at the input portion of said delay line array;
   (d) control means coacting with said steering means for selectively altering a direction of individual light beams directed at the input portion of said delay line array by said light beam steering means for in turn selectively illuminating individual light transmissive channels; and
   (e) output means for producing an output pulse for each light pulse exiting said delay line array.

8. The filter of claim 7 wherein said output means includes summer means for summing the light pulses exiting said light transmissive delay line array and further includes photodetector means for converting the light pulses exiting said delay line array to electrical signals.

9. The filter of claim 8 wherein said light beam generator means includes a pulsed laser coupled to beam replicator means for producing the group of light beams.

10. The filter of claim 8 wherein said light pulse generator means is a spatial light modulator.

11. The filter of claim 10 wherein said spatial light modulator is a segmented mirror device.

12. The filter of claim 7 wherein said light beam generator means includes a pulsed laser coupled to beam replicator means for producing the group of light beams.

13. The filter of claim 12 wherein said light beam steering means is a spatial light modulator.

14. The filter of claim 13 wherein said spatial light modulator is a segmented mirror device.

15. The filter of claim 7 wherein said light beam steering means is a spatial light modulator.

16. The filter of claim 15 wherein said spatial light modulator is a segmented mirror device.

* * * * *